(12) United States Patent
Ting

(10) Patent No.: US 11,006,252 B2
(45) Date of Patent: May 11, 2021

(54) MULTIPLE USAGE RATES

(71) Applicant: TEXTNOW, INC., Waterloo (CA)

(72) Inventor: Derek Ting, Waterloo (CA)

(73) Assignee: TEXTNOW, INC., Waterloo (CA)

( * ) Notice: Subject to any disclaimer, the term of this patent is extended or adjusted under 35 U.S.C. 154(b) by 0 days.

(21) Appl. No.: 16/861,852

(22) Filed: Apr. 29, 2020

(65) Prior Publication Data

US 2020/0260238 A1     Aug. 13, 2020

Related U.S. Application Data

(63) Continuation of application No. 16/367,576, filed on Mar. 28, 2019, now Pat. No. 10,681,510.

(60) Provisional application No. 62/649,931, filed on Mar. 29, 2018.

(51) Int. Cl.
*H04W 4/24* (2018.01)
*H04M 15/00* (2006.01)
*H04W 84/12* (2009.01)

(52) U.S. Cl.
CPC ............. *H04W 4/24* (2013.01); *H04M 15/56* (2013.01); *H04W 84/12* (2013.01)

(58) Field of Classification Search
CPC ...... H04M 15/41; H04M 15/43; H04M 15/61; H04M 15/68; H04W 4/24
See application file for complete search history.

(56) References Cited

U.S. PATENT DOCUMENTS

| | | | | |
|---|---|---|---|---|
| 2004/0008672 A1* | 1/2004 | Kobylarz | ............. | H04M 15/00 370/352 |
| 2014/0064467 A1* | 3/2014 | Lawson | ................ | H04M 15/68 379/114.03 |

* cited by examiner

*Primary Examiner* — Sam Bhattacharya
(74) *Attorney, Agent, or Firm* — Perry + Currier Inc.

(57) ABSTRACT

An example communications system for providing communication services between communications devices may employ multiple usage rates for metered communication services. A method for adjusting usage amounts to account for multiple usage rates may include determining a usage adjustment factor for a communications event; determining a metered usage amount for the communications event; and determining an adjusted usage amount based on the usage adjustment factor and the metered usage amount for the communications amount. Thus, a billing system in the communications system may determine an invoice amount based on the adjusted usage amount and a predetermined bill rate.

16 Claims, 5 Drawing Sheets

MULTIPLE USAGE RATES

FIELD

The present invention relates to electronic communications and in particular to usage rates for billing.

BACKGROUND

A telephone network operator ("Carrier") is a communications services provider that may have a fixed and/or wireless network infrastructure to provide communications services to its customers. A Carrier may utilize a combination of any number of technologies including those wireless technologies provided by any number of mobile network providers (such as cellular, LTE™) and those provided by any number of consumer establishments where Wi-Fi®, and the like, may be freely available to customers for Internet access.

A Carrier may use Voice over Internet Protocol (VoIP) which is a technology that provides voice communications services and data communications services (e.g., multimedia sessions) over Internet Protocol (IP) networks, such as the Internet and/or private packet networks. Typically, a software telephony application using VoIP which can be installed on various devices such as handheld devices with Android or iOS operating systems, and desktop or laptop computers with Windows or Linux operating systems, for example. Further, VoIP technologies have evolved to include a telephone number for users and which include Short Message Service (SMS) for text messaging services.

These software telephony applications may be installed on mobile devices as well as fixed (hard-wired desktop) computers. When these mobile devices are roaming in another country or another carrier's territory, typically different voice and data rates apply. Billing systems would then have to take into account these different rates in various roaming countries and territories, thereby increasing their complexity and further increasing the difficulty of communicating such rate differences to the users.

SUMMARY

According to one aspect of the present invention, there is provided a communications system for providing metered communication services, the communications system comprising: a mobile network to provide mobile network communications services for a plurality of mobile communications devices over a wide-area IP network; a wireless local-area network (WLAN) to provide wireless network communications services for a plurality of communications devices over the wide-area IP network; a Voice over Internet Protocol (VoIP) service coupled to the mobile network and the WLAN via the wide-area IP network to provide VoIP communications services for the plurality of communications devices; a public switched telephone network (PSTN) coupled to the VoIP service; a communications routing system coupled to the plurality of communications devices via the wide-area IP network; and a billing system coupled to the communications routing system, the billing system configured to determine an invoice amount based on an adjusted usage amount and a predetermined bill rate, wherein the adjusted usage amount is determined based on a usage adjustment factor and a metered usage amount for each communications event.

According to another aspect of the present invention, there is provided a communications system wherein the adjusted usage amount is determined by the communications routing system prior to processing by the billing system.

According to another aspect of the present invention, there is provided a communications system wherein the adjusted usage amount is determined by the billing system during processing for invoicing.

According to another aspect of the present invention, there is provided a communications system wherein the usage adjustment factor is determined based on one or more of: a geographic location, a day of week, a time of day, a promotional event, a special sales rate, terms of a carrier plan, and a network rate.

According to another aspect of the present invention, there is provided a communications system wherein the usage adjustment factor is displayed on the communications device.

According to another aspect of the present invention, there is provided a communications system wherein the usage adjustment factor is displayed on the communications device with a roaming indicator.

According to another aspect of the present invention, there is provided a communications system wherein the metered usage amount is based on one or more of: bandwidth used for the communications event, a duration of the communications event, and cost per unit of time for the communications event.

According to another aspect of the present invention, there is provided a communications system wherein the usage adjustment factor is a multiple of a fixed cost.

According to another aspect of the present invention, there is provided a communications system wherein the usage adjustment factor is a multiple of a home network cost.

According to one aspect of the present invention, there is provided a method in a communications system for providing communication services between communications devices wherein the communication services are metered, the method comprising: determining a usage adjustment factor for a communications event; determining a metered usage amount for the communications event; and determining an adjusted usage amount based on the usage adjustment factor and the metered usage amount for the communications event.

According to another aspect of the present invention, there is provided a method further comprising determining an invoice amount based on the adjusted usage amount and a predetermined bill rate.

According to another aspect of the present invention, there is provided a method wherein the adjusted usage amount is determined by a communications routing system prior to determining the invoice amount by a billing system.

According to another aspect of the present invention, there is provided a method wherein the adjusted usage amount is determined by a billing system during determining the invoice amount.

According to another aspect of the present invention, there is provided a method wherein the usage adjustment factor is determined based on one or more of: a geographic location, a day of week, a time of day, a promotional event, a special sales rate, terms of a carrier plan, and a network rate.

According to another aspect of the present invention, there is provided a method further comprising displaying the usage adjustment factor on a communications device.

According to another aspect of the present invention, there is provided a method wherein the usage adjustment factor is displayed on the communications device with a roaming indicator.

According to another aspect of the present invention, there is provided a method wherein the metered usage amount is based on one or more of: bandwidth used for the communications event, a duration of the communications event, and cost per unit of time for the communications event.

According to another aspect of the present invention, there is provided a method wherein the usage adjustment factor is a multiple of a fixed cost.

According to another aspect of the present invention, there is provided a method wherein the usage adjustment factor is a multiple of a home network cost.

According to one aspect of the present invention, there is provided a communications device comprising: a memory; a communications interface; a processor interconnected with the memory and the communications interface, the processor configured to: determine a usage adjustment factor for a communications event; determine a metered usage amount for the communications event; and determine an adjusted usage amount based on the usage adjustment factor and the metered usage amount for the communications event.

BRIEF DESCRIPTION OF THE DRAWINGS

The drawings illustrate, by way of example only, implementations of the present invention.

DETAILED DESCRIPTION

The present invention generally relates to providing wireless carrier services (e.g., voice calls, short message service or SMS messages, general data communications, etc.) with quality of service to VoIP telephone numbers where each VoIP telephone number is associated with one or more communications devices. While certain infrastructure may not operate under Internet Protocol (IP) (e.g., PSTNs, cellular base station networks, etc.), communications are routed to and from such infrastructure using IP to the extent possible. The present invention also generally relates to providing communications with QoS between communication devices operating under the same account (same VoIP telephone numbers), and tracking and managing prepaid balances for traditional carrier services (e.g., voice call minutes, SMS messages, etc.) that are routed, an may be delivered, over IP. Other aspects of the present invention will also become apparent in light of the following detailed description.

These communication devices may have different charges (rates) for a number of reasons such time of day, time of week, and roaming or not. Typically, different voice and data rates may apply with such communication systems providing metered communications services. Billing systems would then have to take into account these different rates in various roaming countries and territories, thereby increasing their complexity especially in prepare invoices, and further increasing the difficulty of communicating such rate differences to the users. It is advantageous in simplifying the billing system if the amount of bandwidth used is adjusted instead of changing the charge rates for different locations and times. This would further improve communications of the rates to the users.

Figure 1:
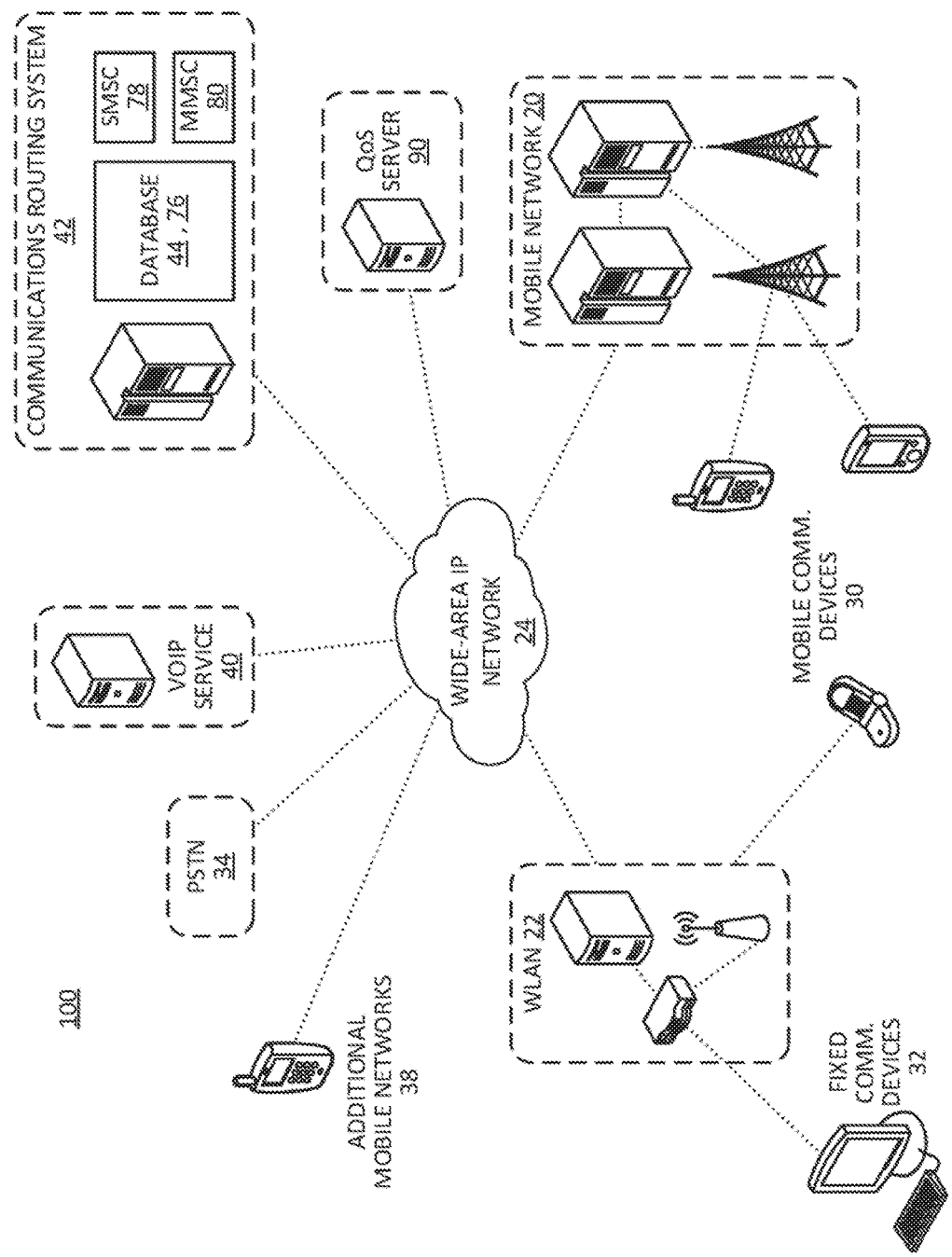
FIG. 1 is a block diagram of a communications system which uses multiple usage rates.

FIG. 1 shows a block diagram of a communications system which uses multiple usage rates.

The communications system 100 includes a mobile network 20, such as a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides mobile network communications services, such as voice, data, and SMS services.

The communications system 100 further includes at least one wireless local-area network (WLAN) 22 that operates under one or more known standards and technologies, such as IEEE 802.11.

The mobile network 20 and the WLAN 22 each connect to a wide-area IP network 24, such as the Internet. The WLAN 22 can be connected to the wide-area IP network 24 by an Internet service provider (ISP) or the similar entity (not shown). The mobile network 20 can be connected to the wide-area IP network 24 by a packet data interface.

The communications system 100 can further include a push notification service, such as the kind operated by Google Inc. of Mountain View, Calif., and Apple Inc. of Cupertino, Calif.

A plurality of mobile communications devices 30 can connect to the mobile network 20, via base stations and other infrastructure, and can further connect to the WLAN 22, via access points or similar. The WLAN 22 thus provides wireless network communication services. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In various implementations, different mobile communications devices have different types of wireless communications interfaces, different configurations, and/or different access rights suitable for connection to different mobile networks and different WLANs.

For clarity of illustration, while FIG. 1 has lines showing communication between certain parts of the communications system 100, all of the parts (such as WLAN 22 via ISP and/or mobile network 20) connecting to the wide-area IP network 24 may be configured to communicate with each other. Further, some parts of the communications system 100 are not shown to enhance clarity, for example, the communications of a Push Notification Service (not shown) with the plurality of mobile communications devices 30 via the mobile network 20 or the WLAN 22.

One or more stationary (fixed) communications devices 32, such as a desktop computer, laptop or wi-fi only device, server, or similar, can also connect to the WLAN 22, via a router or wired access point. For clarity, the term communications devices 30, 32 means mobile communications devices 30 and fixed communications devices 32.

The communications system 100 can further be connected to a public switched telephone networks (PSTN) 34 that supports connecting to a plurality of landline telephones and additional mobile networks 38. The additional mobile networks 38 may have the same or similar features of the mobile network 20 and may be operated by different carriers and/or operated according to different technologies and standards when compared to the mobile network 20. For clarity, the mobile communications devices 30 connected to the mobile network 20 may also initiate to or receive voice calls directly from the PSTN 34 (which includes additional mobile networks 38) via the mobile network 20. Further, such voice calls, for example, may be via GSM (Global System for Mobile communication) from the mobile network 20. For convenience, such voice calls via the mobile network 20 in this disclosure are referred to as via a "voice channel". This is in contrast to VoIP voice calls using a "data channel" of the mobile network 20 such as the Packet Data Channel of GPRS (General Packet Radio Service).

The communications system 100 further includes at least one voice-over-IP (VoIP) service 40, which can be configured to manage IP data streams related to VoIP communications services (for example routing the IP data steam from communications device 30, 32 to another communications device 30, 32). All VoIP calls are steamed through the VoIP service 40. It also interfaces (transcoding as necessary) with the PSTN 34 and the additional mobile networks 38.

The VoIP service 40 may operate using one or more protocols, such as the Session Initiation Protocol (SIP), and one or more audio codecs, such as Opus. The VoIP service 40 can be connected to the PSTN 34 to allow VoIP calls to be place to and from landlines and wireless devices in the additional mobile networks 38. One of the functions of the VoIP service 40 is to transcode the IP data streams so that it is compatible between different networks (for example between the mobile network 20 and the PSTN 34). In some implementations, the VoIP service 40 is a subcomponent of the mobile network 20 or the additional mobile networks 38.

The communications system 100 further includes a communications routing system 42 connected to the VoIP service 40, the push notification service, and the mobile network 20 via the wide-area IP network 24. In some implementations, the VoIP service 40 is directly connected to the communications routing system 42 via a local IP network distinct from the wide-area IP network 24. The communications routing system 42 is configured to direct the routing of communications of disparate types between mobile communications devices 30 via the mobile network 20 and/or the WLAN 22, and further with communications devices (including landlines) of the PSTN 34 and the additional mobile networks 38 as needed.

The communications system 100 can further include a proxy (not shown) connected to the communications routing system 42, the WLAN 22, and the mobile network 20 via the wide-area IP network 24. In some implementations, the communications routing system 42 and the mobile communications devices 30 can be configured to route communications events through the proxy. The proxy can be configured to handle VoIP call handoffs, as an alternative to the communications routing system 42 handling such. In addition, the proxy can be configured to prioritize communications events associated with the enhanced 911 system, as an alternative to the communications routing system 42 doing so. For example, the proxy can control quality of service (QoS) settings for various communications, so that 911 calls are prioritized. In some implementations, the VoIP service 40 is configured to route all relevant VoIP data through the proxy. A suitable proxy service can be in the form of that available from Pravala Networks Inc., of Kitchener, Ontario, Canada.

Figure 2:
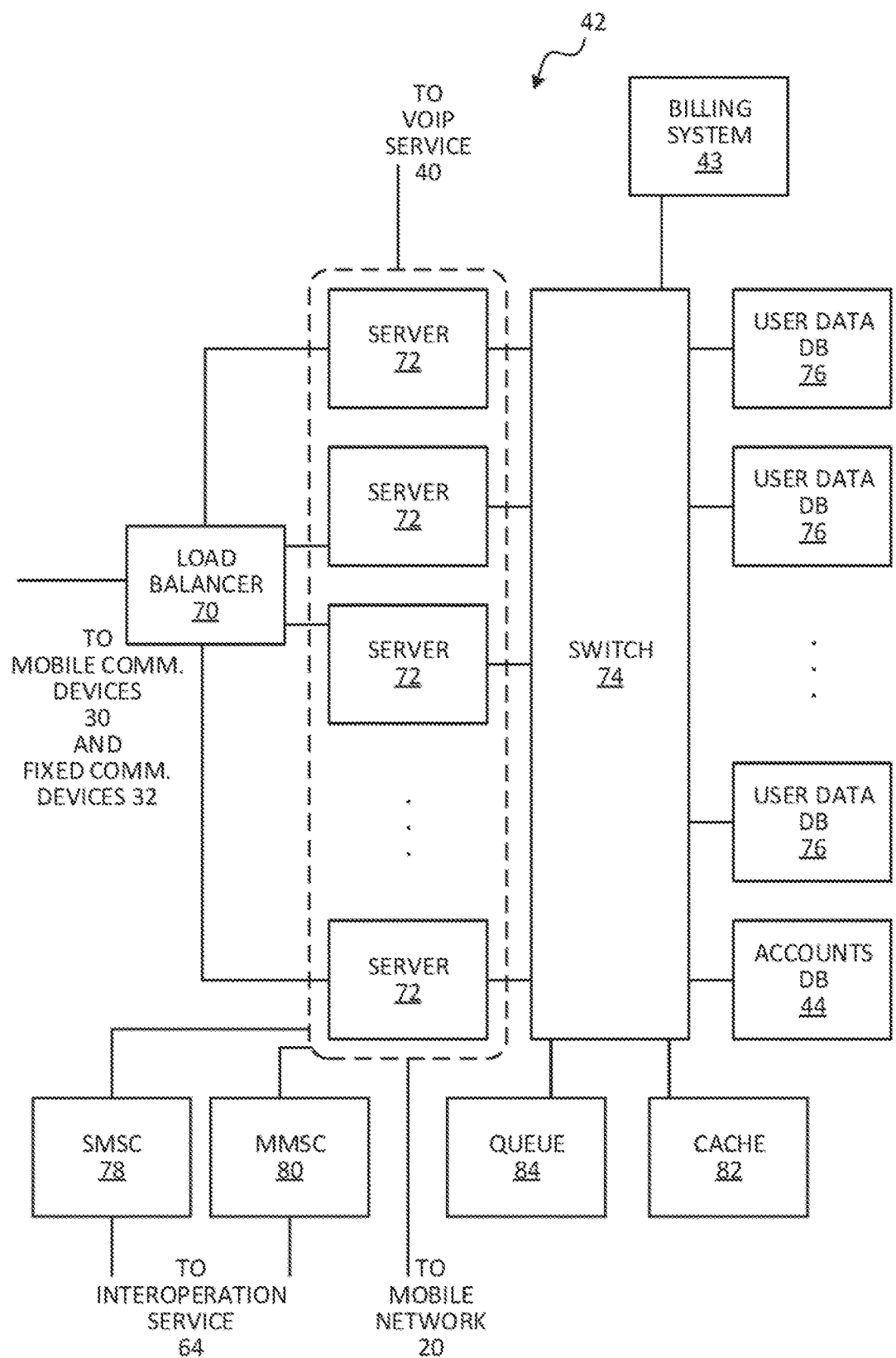
FIG. 2 is a block diagram of a communications routing system.

The communications system 100 can further include an interoperation service 64 (as seen in FIG. 2) connecting the communications routing system 42 to the mobile network 20 via the wide-area IP network 24. The communications routing system 42 can be connected to the interoperation service via a virtual private network (VPN) established over the wide-area IP network 24. The interoperation service is configured to interface with the various mobile networks 20, 38. The interoperation service facilitates data communications between the communications routing system 42 and the mobile network 20. The interoperation service further facilitates messaging services, such as SMS and MMS, between the communications routing system 42 and the additional mobile networks 38. The interoperation service can be the kind provided by Syniverse of Tampa, Fla.

The communications routing system 42 includes at least one database, such as an accounts database 44 and one or more user data databases 76 (see FIG. 2), configured to store a plurality of associations between unique account identifiers (e.g., user names) and device identifiers including mobile-network identifiers supported by the mobile network 20, such as mobile directory numbers (MDNs, or telephone numbers) of the mobile communications devices 30, and fixed identifiers of the fixed communications devices 32. For each user name, the database 44, 76 can store associations with a number of communications devices 30, 32. A user may have one or more fixed communications devices 32 and/or one or more mobile communications devices 30. For some embodiments, a mobile device, such as a laptop or tablet, with only WLAN 22 capabilities can be treated as fixed communications devices 32.

One mobile communications device 30 can have a first MDN for SMS/MMS messages and VoIP calls, and a second MDN for services on the mobile network 20. The first and second MDNs are district and mutually different. The first MDN is used at the VoIP service 40 and the communications routing system 42 for VoIP calls. The first MDN is also used at the interoperation service and communications routing system 42 for communicating SMS/MMS messages. In some implementations, the first MDNs are landline telephone numbers obtained from at least one competitive local exchange carrier (CLEC). The second MDN is used by the mobile network 20 to track data usage by each respective mobile communication device 30, with the communications routing system 42 using the second MDNs to map data usage to particular accounts. The database 44, 76 may further store push tokens to identify mobile communications devices 30 via the push notification service, so that the communications routing system 42 can send push notifications to the mobile communications devices 30. Alternately or additionally, the database 44, 76 may store currently assigned IP addresses for the communications devices 30, 32.

In some embodiments, only the first (VoIP) MDN is used and the first MDN is registered with the mobile network 20 for data usage at the mobile network 20. For such embodiments, functionality described herein described with respect to the second (mobile network) MDN is performed using the first (VoIP) MDN.

In other embodiments, a VoIP telephone number is associated with each user name which is distinct from the MDNs of the one or more mobile communication devices 30 of the user. The IP addresses of the communications devices 30, 32 may be obtained when the communications devices 30, 32 contacts the communications routing system 42.

The communications routing system 42 further includes a routing engine responsive to incoming communications events. Incoming communications events can include initiation of voice calls, ending of voice calls, communication of SMS/MMS messages, requests for data. The routing engine is further configured to route data communications with the plurality of mobile communications devices 30 over the mobile network 20 and the WLAN 22 using the Internet, as well as with the plurality of fixed communications devices 32 over the WLAN 22 using the Internet. The routing engine is further configured to initiate and end voice calls with communications devices 30, 32 as VoIP calls using the VoIP server 40, and to communicate SMS messages with the plurality of mobile communications devices 30 via the mobile network 20 and the WLAN 22 using the Internet, as well as with the plurality of fixed communications devices 32 over the WLAN 22 using the Internet.

The communications routing system 42 can further include a short message service center (SMSC) 78 and a multimedia message service center (MMSC) 80 configured to store, forward, convert and deliver SMS and MMS messages between the communications routing system 42 and the interoperation service. The SMSC 78 and MMSC 80 can be configured to communicate with the interoperation service using the Short Message Peer-to-Peer (SMPP) protocol.

Each mobile communications device 30 and fixed communications device 32 can be associated with one of the unique account identifiers (e.g., user names) stored in the database 44, 76. This can be achieved by, for example, a client program executed on the mobile communications device 30 requiring a user log in. When a user is logged in to the client program, for example, the mobile communications device 30 becomes associated with the respective unique account identifier.

For each account identifier (user account) in the database 44, 76; there is associated a voice call log, voice mails, SMS/MMS messages, contacts, and other such account data. Such account data must be synchronized with the communications devices 30, 32 of each account identifier so that a user may review the same account data between different communications devices 30, 32 of the user. The account data may further include a metered usage amount which represents an amount of data bits used for each voice call (where carried over the voice channels), an amount of time of each voice call, and an amount of data bits used for each SMS/MMS message, voice mail, and other communications events. The account data may further include an adjusted usage amount adjusted based on an adjustment factor and the metered usage amount based on parameters of the communications event. Parameters may include the time of day, the day of week, the geographic location, and other factors of the communications event. This account data is used by a billing system 43 to, for example, prepare monthly invoices for the user accounts. It will be understood that tracking of the account of data usage for the telephone events may include more of such events than herein listed or less of such events than herein listed. The account data further includes indications of the geographic location of the communications devices 30, 32 when the telephone events were recorded. The geographic location herein may include any of mobile network codes, country codes, mobile country codes, and any other indication of geographic location or area.

Each account identifier can be associated with a plurality of mobile communications devices 30, and each of the mobile communications devices 30 can be associated with a first mobile-network identifier, such as a first MDN that is associated with the VoIP service 40. Each account identifier can be associated with a second mobile-network identifier, such as a second MDN that is associated with mobile data access on the mobile network 20. In some implementations, the second MDN is only associated with mobile data access on the mobile network 20 to the exclusion of access to circuit-switched voice services and SMS/MMS services that may be available on the mobile network 20. The mobile network 20 uses the second MDN to track data usage of the mobile communications device 30, which can be reported to the communications routing system 42. Hence, for each account identifier, voice services via the VoIP server 40 are conducted with one MDN and data services are conducted via the mobile network using a different MDN. The communications routing system 42 maps each MDN to a particular account for managing overall services to that account identifier.

An outgoing voice call from a communications device 30, 32 is conducted as follows. The communications device 30, 32 sends a call request to the VoIP service 40 via the WLAN 22, if connected, or otherwise via the mobile network 20. The communications device 30, 32 registers with the VoIP service 40 if not already registered. If the destination device is on the PSTN 34, the VoIP service 40 completes the call via the PSTN 34. If the destination device has an account with the communications routing system 42, then the VoIP service 40 notifies the communications routing system 42 of the call request. The communications routing system 42 then issues a push notification to the destination device (if connected via mobile network 20, through the push notification service) to notify the destination device of the call. Then the destination device registers with the VoIP service 40, if not already registered, and notifies the VoIP service 40 of call acceptance. The VoIP service 40 can notify the communications routing system 42 of call initiation and ending. When the proxy is used, VoIP voice data is routed through the proxy. The outgoing voice call event is recorded in the associated account data of the account identifier in the communications routing system 42 so that it may be synchronized with the client programs on the other communications devices 30, 32 of the account identifier.

The mobile communications devices 30 can perform SIP registrations in a variety of ways.

For mobile communications devices 30 operating on iOS by Apple Inc., the mobile communication device 30 receiving a push notification does not immediately trigger SIP registration. Rather, the push notification informs the user of the incoming call, via an alert or similar. The user can then respond to the push notification by opening the client program, which then performs the SIP registration.

For mobile communications devices 30 operating on Android by Google Inc., the mobile communication device 30 can be configured to perform a SIP registration in response to receiving a push notification for an incoming call. That is, the SIP registration process can be started before the user has accepted the call.

For some embodiments, incoming voice calls to a VoIP telephone number of the communications devices 30, 32 arrive at the VoIP service 40 via the PSTN 34 (for example). Incoming voice calls may also arrive at the VoIP service 40 via the mobile network 20 or the WLAN 22. The VoIP service 40 notifies the communications routing system 42 of a call request for a particular destination communications device 30, 32. The communications routing system 42 then issues a push notification to all of the destination communications devices 30, 32 (through the push notification service, where connected to the mobile network 20), associated with the VoIP telephone numbers, to notify the destination communications devices 30, 32 of the call.

If the user of the destination communications devices 30, 32 accepts the call on one of the destination communication devices 30, 32, then the destination communications device 30, 32 registers with the VoIP service 40, if not already registered, and notifies the VoIP service 40 of call acceptance. The VoIP service 40 notifies the communications routing system 42 of call initiation and ending.

Incoming and outgoing voice calls made to or from a communications device 30, 32 associated with the communications routing system 42 are made using the VoIP telephone number, which is established at the VoIP service 40. When such a call is conducted as data via the mobile network 20, the second MDN of the relevant mobile communications device 30 is used to track the data usage on the mobile network 20.

In some embodiments, caller ID is based on the VoIP telephone number to the exclusion of the mobile network MDN. That is, the mobile network MDN is for tracking data usage only, and the VoIP telephone number is the basis for outgoing and incoming calls.

An outgoing SMS/MMS message can be sent by a communications device 30, 32 as follows. One or more IP data packets containing the SMS/MMS message are sent from the communications device 30, 32 to the communications routing system 42 via the WLAN 22, if connected, or otherwise via the mobile network 20. The sent data specifies a destination device using an MDN. The communications routing system 42 determines whether the MDN is stored in the database 44, 76 and thus whether the destination device is a communications device 30, 32 associated with the communications routing system 42. If the destination device is a communications device 30, 32 associated with the communications routing system 42, then the communications routing system 42 stores the message and sends a push notification to the destination communications device 30, 32 via the push notification service (if connected via the mobile network 20). When a user at the destination communications device 30, 32 opens an SMS/MMS application/module or performs a similar action, the destination communications device 30, 32 fetches the stored message from the communications routing system 42. If the destination device is not associated with the communications routing system 42, then the communications routing system 42 sends the SMS/MMS message to the destination device via the interoperation service.

Incoming SMS/MMS messages for the communications devices 30, 32 arrive at the communications routing system 42 either directly from other communications devices 30, 32 that have accounts at the communications routing system 42 or via the interoperation service for devices that are not associated with the communications routing system 42. The communications routing system 42 stores a particular SMS/MMS message and sends a push notification to the destination communications device 30, 32. When a user at the destination communications device 30, 32 opens an SMS/MMS application/module or performs a similar action, the destination communications device 30, 32 fetches the stored message from the communications routing system 42.

Incoming and outgoing SMS/MMS messages made to or from a mobile communications device 30 associated with the communications routing system 42 are made using the first MDN. When messages are sent as data through the mobile network 20, the second MDN of the respective mobile communications device 30 is used to track the data usage on the mobile network 20.

Incoming and outgoing SMS/MMS messages are recorded in the associated account data of the account identifier in the communications routing system 42 so that it may be synchronized with the client programs on the other communications devices 30, 32 of the account identifier. In some embodiments, this synchronization occurs as and when the user of the other communication devices 30, 32 accesses the associated client programs when the client programs contacts the communications routing system 42 to synchronize with the incoming and outgoing SMS/MMS messages, the voice call logs, the voice mails, and other such services including an address book of contacts.

Data communications between communications devices 30, 32 and between communications devices 30, 32 and data sources, such as web sites connected to the wide-area IP network 24, are performed via the WLAN 22, if connected, and otherwise via the mobile network 20.

The communications system 100 further comprises a quality of services (QoS) server 90. The QoS server 90 determines the performance of a data channel to a communications device 30, 32 for a voice call. Where the performance of the data channel to a communications device 30, 32 degrades or drops, the QoS server 90 directs the communication routing system 42 to establish a new channel to the communications device 30, 32 to continue the voice call. In the event that all data channels are degraded or terminated, then the QoS server 90 directs the communications routing system 42 to continue the voice call via a voice channel over the PSTN 34 (or mobile network 20) when the mobile communications device 30 is connected to the mobile network 20.

The QoS server 90 is shown as a standalone component in FIG. 1, however, it may be a subcomponent of another component such as the VoIP Service 40 and the communications routing system 42. The QoS server 90 is connected to the wide-area IP network 24 and as such a connection can be made with any of the communications devices 30, 32.

For further clarity, it will be understood that the mobile communications devices 30 may be simultaneously connected to both the mobile network 20 and the WLAN 22. While mobile network 20 may generally provide a better performing data channel then the WLAN 22 for voice calls, the WLAN 22 may provide the data channel free of charge to users.

FIG. 2 shows a diagram of the communications routing system 42. The communications routing system 42 includes a load balancer 70, a plurality of servers 72, a switch 74, a plurality of user data databases 76, a billing system 43, and the accounts database 44. The load balancer 70, servers 72, and switch 74 can be considered a routing engine. However, this is not limiting.

Communications devices 30, 32 connect to the load balancer 70 via the wide-area IP network 24 using a protocol, such as HTTP, HTTPS, or the like. The load balancer 70 is configured to balance requests from the communications devices 30, 32 among the servers 72.

The servers 72 are connected to the load balancer 70. The servers 72 can be configured to interface with the VoIP service 40 and the mobile network 20. The servers 72 can be clones having the same functionality. The servers 72 contain program code configured to interface with application programming interfaces (APIs) provided by the VoIP service 40 and the mobile network 20 and/or provide APIs for use by the VoIP service 40 and the mobile network 20. The servers 72 can be implemented using Nginx, PHP, and similar technology.

The SMSC 78 and the MMSC 80 are connected to the servers 72 and configured to store, forward, convert and deliver SMS and MMS messages between the servers 72 and the interoperation service using, for example, the SMPP protocol and the MM4 protocol. The SMSC 78 and MMSC 80 can be configured to connect to the interoperation service via a suitable binding and through a VPN tunnel. The SMSC 78 and MMSC 80 expose an API to the routing engine, such that the routing engine can use the API to send outgoing SMS/MMS messages. For incoming messages, the SMSC 78 and MMSC 80 are configured to invoke an API of the routing engine to cause the routing engine to store a received message and send a notification of the message to the destination communications device 30, 32.

The switch 74 connects the servers 72 to the user data databases 76, the accounts database 44, a cache 82, and a queue 84.

Generally, the accounts database 44 stores fixed user information associated with each user account, while the user data databases 76 store communications events associated with one of the user accounts in the accounts database 44. For example, the accounts database 44 may store account information such as a billing address for the user account, billing history, subscriber information and the like. The account information may further include a password, residential address, contacts (e.g., an address book of contacts), in-app purchases, subscriptions, settings, balance information, and the like. The accounts database 44 may further store the identity of the user data database 76 which stores the user data associated with each account identifier (user account), and can further store the VoIP telephone number for each user. Further, the account information may include a carrier plan (e.g., including billing rates and the like) for each user account.

The user databases 76 may be configured to store communications event histories for all user accounts in the accounts database 44. In particular, a history for a user account may be downloaded to any communications device 30, 32 with which the user logs in (i.e. in association with the particular user account). The communications event data stored in the user databases 76 may include the mobile network MDNs, session ID, call histories, voice mail content, SMS/MMS message transmission histories, SMS/MMS message content, and the like. The communications event data may further include a metered usage amount representing, for example, the amount of data bits used for the particular voice call (where carried over the voice channels), the amount of time of each voice call, the amount of data bits used for each SMS/MMS message, voice mail, and other communications events, or other suitable amounts for metering the usage of a communications event. The communications event data may further include indications of the geographic location of the communications devices 30, 32 when the communications event was recorded. The geographic location may include, but is not limited to, mobile network codes, country codes, mobile country codes, and any other indication of geographic location or area. The communications event data may therefore include a metered usage amount representing, for example, the actual amount of data or bandwidth used, a usage adjustment factor determined based on the parameters of the communications event, and an adjusted usage amount (e.g. the product of the metered usage amount and the usage adjustment factor) representing, for example, the recordable amount of data or bandwidth used to simplify billing procedures, as will be described further herein.

In some embodiments, the user data databases 76 may be implemented as database shards. In some embodiments, the databases 44 and 76 may be combined into one database. Further, in some embodiments, there may be overlap in the data stored in the accounts database 44 and the user databases 76.

The billing system 43 is configured to determine an invoice amount to generate invoices for user accounts. In the present example, the billing system 43 is integrated with the communications routing system 42. In other embodiments, the billing system 43 may be distinct from, but coupled to, the communications routing system 42. The billing system 43 is configured to determine the invoice amount is based on the adjusted usage amount and a predetermined bill rate.

The adjusted usage amount, in turn, is determined based on a usage adjustment factor and the metered usage amount for each communications event. A database of usage adjustment factors may be stored in the databases 44, 76. The usage adjustment factors may vary based on, for example, geographic location, time of day, day of week, promotional events, special sales rates, terms of carrier plans, network rates, and other suitable parameters of the communications event or other indicators. For example, network rates may vary when the communications device 30, 32 is connected to carrier A versus when the communications device 30, 32 is connected to carrier B. This may be a result of the home carrier not having coverage at a location where another carrier has coverage.

For example, communications events occurring in Canada on the home network of the communications device 30, 32, the usage adjustment factor may be 1. In contrast, in the US, the usage adjustment factor may be 0.8, while in Japan, the usage adjustment factor may be 3, and in the EU, the usage adjustment factor may be 4.7. Further, detailed rules may be applied to determine the usage adjustment factor. For example, if, for a particular communications event, the country is determined to be the S but on the network of Sprint™ (mobile network code), then the usage adjustment factor may be 0.5 instead of 0.8. This may be due to, for example, certain relationships between foreign carriers and home network carriers. Additionally, the usage adjustment factors may be time dependent. For example, if the communications event is determined to have a country code of US, a mobile network code of Sprint™ between the hours of 12 AM to 7 AM or 10 PM to 12 AM (e.g. during the evening), then the usage adjustment factor may be 0.4 instead of 0.8. Further combinations of indicators determining the usage adjustment factors are also contemplated.

The metered usage amount is raw amount of data, bandwidth, time, or other unit of measurement used during the communications event. For example, a voice call may use 100 MB (megabytes) of data or may have a duration of 9 minutes.

The adjusted usage amount is obtained by applying the usage adjustment factor to the metered usage amount (e.g. by multiplication). For example, for a voice call having a metered usage amount of 100 MB, the adjusted usage amount may be 80 MB under parameters associated with a usage adjustment factor of 0.8, while the adjusted usage amount may be 300 MB under parameters associated with a usage adjustment factor of 3.

In some embodiments, the adjusted usage amount may be determined prior to processing by the billing system 43. For example, the adjusted usage amount may be determined in real-time of a communications event at the communications device 30, 32 initiating the communications event. That is, the communications device 30, 32 may determine the usage adjustment factor (e.g. in cooperation with the communications routing system 42 and the database of usage adjustment factors) for the communications event based on, for example, the current geographic location of the communications device 30, 32, and the determined network and time of day. Upon termination of the communications event, the communications device 30, 32 may apply the usage adjustment factor to the metered usage amount to obtain the adjusted usage amount. Thus, the user data database 76 may record only the adjusted usage amount for the communications event.

In other examples, the communications device 30, 32 may determine the usage adjustment factor and may meter the communications event to determine the metered usage amount, which are recorded in the user data database 76. The communications routing system 42 may include a pre-processing module (not shown) configured to obtain the usage adjustment factor and the metered usage amount for each communications event and apply the usage adjustment factor to the metered usage amount to obtain the adjusted usage amount prior to processing by the billing system 43. In further examples, the communications device 30, 32 may meter the communications event to determine the metered usage amount, as well as monitoring relevant parameters of the communications event. The metered usage amount and the parameters of the communications event may be recorded in the user data database 76. The pre-processing module may thus be configured to determine the usage adjustment factor based on the stored parameters of the communications event and the database of usage adjustment factors.

The billing system 43 may thus simply retrieve the predetermined bill rate and the adjusted usage amount from the accounts database 44 and/or the user data databases 76 to generate the invoice amount.

It is advantageous to adjust the metered usage amount by the usage adjustment factor at the time of the communications event (i.e. in near real-time). In this manner, users may view the accumulated adjusted usage amount used during a billing period to the total usage amount allowed for the billing period under a carrier plan (i.e. 2 GB for $10 per month). That is, the adjusted usage amount allows a standard "usage amount" to be applied to different communications events occurring under different parameters, which would otherwise be billed at different rates, thus remaining invisible until the time of billing. Further, the adjusted usage amount may be utilized to simplify invoicing, as it accounts for different usage rates (e.g. different bill rates) of communications events occurring under different parameters. That is, the adjusted usage amount is recorded as a standard to which the same bill rate may apply while still accounting for the different parameters of the different communications events. Further, this allows a single, predetermined bill rate to be applied to the total adjusted usage amount across all communications events, rather than determining separate bill rates based on the parameters of each communications event.

In other embodiments, the pre-processing module may be integrated into the billing system 43, and hence the adjusted usage amount may be determined by the billing system 43 during processing for invoicing. In particular, the billing system 43 may retrieve the metered usage amounts and the applicable usage adjustment factors from the user data databases 76 for determining the adjusted usage amount.

A common state for mobile communications devices 30 is "roaming" where the mobile communications devices 30 are not in their "home" area of their wireless plan (for example) with their carrier. Typically, a "roaming" indicator, like "Roam" or "RM", is displayed. It is advantageous to have, for example, "2.5× ROAM" displayed to the users to indicate that they are roaming and that their charges will apply with a usage adjustment factor of 2.5. In this example, the charges could be 2.5 times the home price or 2.5 times the bandwidth used or 2.5 times of another suitable metered usage amount of the user's wireless plan. In another example, the usage rate may also be zero, such as "0× ROAM" or just "0×", for when the communications devices 30, 32 are set up to use free Wi-Fi.

The user data is stored by the communications routing system 42 so that it may be synchronized with the client programs on the communications devices 30, 32 of the account identifiers (i.e. user accounts). In some embodiments, this user data synchronization occurs as and when the user accesses the client programs on the of the communication devices 30, 32 of the user.

In addition, for some embodiments, the routing engine is configured to answer incoming calls with a busy signal when one of the communications devices 30, 32 of associated with the VoIP telephone number is in another call. In other embodiments, the routing engine is configured to instead ring (notification including by audio and/or vibration) the communications devices 30, 32 with the communications device 30, 32 is in the another call providing an indication (by audio or vibration) of a new call.

The cache 82 can be checked for data prior to requesting data from the user data databases 76. In addition, requests can be queued in the queue 84, which can be implemented using Redis or similar technology.

In some embodiments, a non-transitory computer-readable medium (CRM) may be provided integrated with or independent from the system 100. The CRM may include an electronic, magnetic optical or other physical storage device that stores instructions executable by a processor. In particular, the instructions may cause the processor to perform the functions described herein. For example, the communications device 30, 32 may include a memory including the CRM having instructions recorded thereon, a communications interface, and a processor configured to perform the functions described herein via execution of the instructions. In other examples, the communications routing system 42 may include server having a memory including the CRM having instructions recorded thereon, a communications interface, and a processor configured to perform the functions described herein via execution of the instructions.

Figure 3:
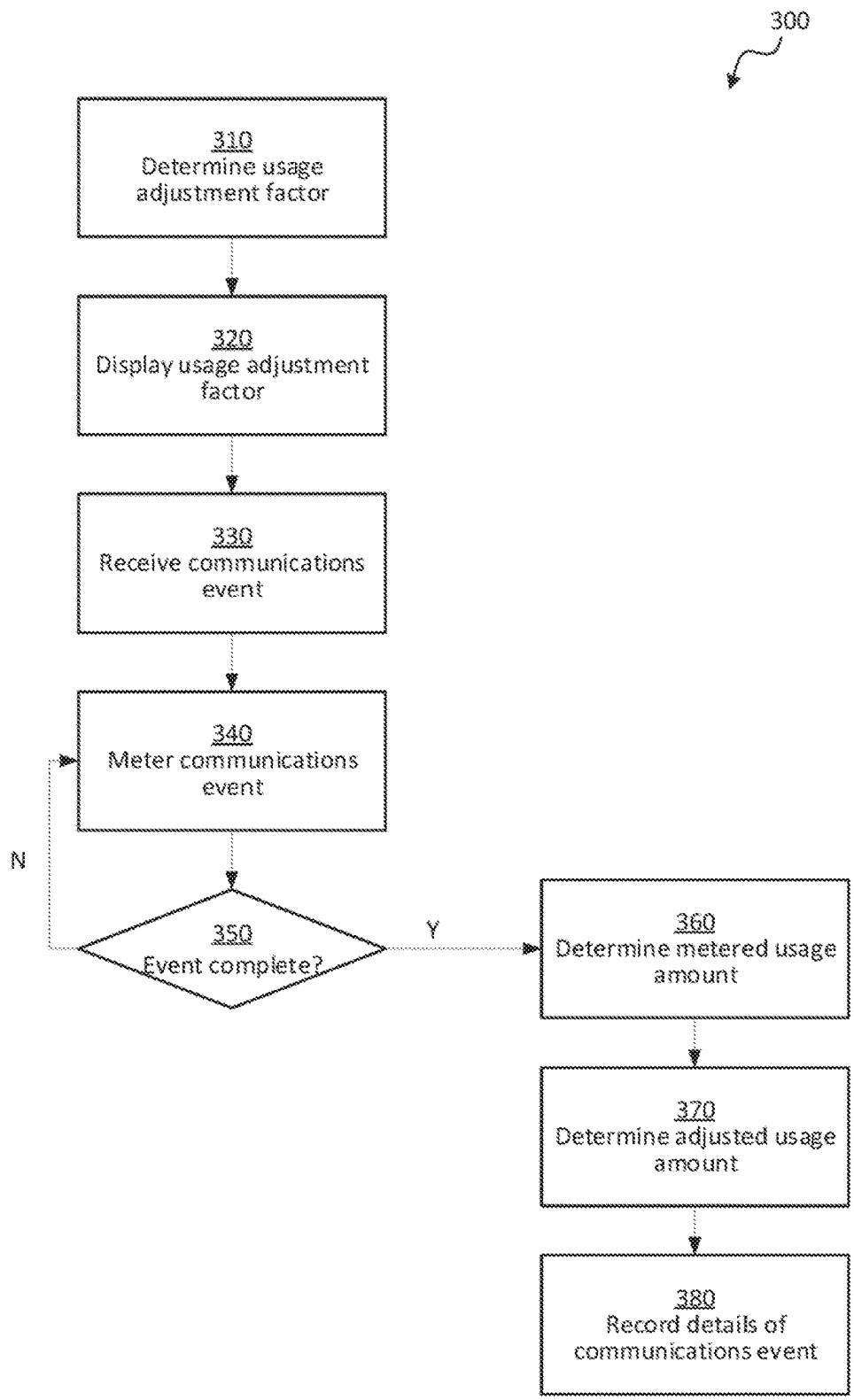
FIG. 3 is a flow diagram of a method of operating a communications device with multiple usage rates according to an embodiment.

FIG. 3 shows a flow diagram of a method 300 of operating a communications device with multiple usage rates according to one embodiment. The method 300 is described with respect to the system of FIG. 1 and FIG. 2. The method 300 is performed by one of or both of the communications routing system 42 and the communications device 30, 32. Further, the method 300 is described based on the example of calculating the adjusted usage amount based on the usage adjustment factor before being stored in near real-time. In particular, the method 300 is for adjusting usage amounts to account for multiple usage rates in the communications system 100.

At block 310, the usage adjustment factor is determined based on parameters determined by the communications device 30, 32. For example, the usage adjustment factor may be determined based on the geographic location of the communications device 30, 32, as determined, for example, by a global positioning system (GPS) module of the communications device 30, 32, by an IP address, by the connected mobile network (carrier), and or by mobile country codes. The usage adjustment factor may further be determined based on the time of day, the day of week, whether the communications device 30, 32 is connected with a Wi-Fi access point, and other parameters. For example, the usage adjustment factor may be lower when the communications device 30, 32 is connected to a Wi-Fi access point, or when it is an evening or weekend.

At block 320, the usage adjustment factor is displayed at the communications device 30, 32 as an indication of a multiplier of, for example, the home network cost. For example, the home network cost may have a day rate, a night rate, and a weekend rate. Alternatively, the usage adjustment factor may be a multiplier of a standard cost such as a fixed cost or a nominal network cost. In some examples, the usage adjustment factor may be displayed on the communications device 30, 32 with a roaming indicator.

In some embodiments, the usage adjustment factor may be recalculated after a predetermined period of time (e.g. every 30 minutes), or may be recalculated upon detection of a triggering event, such as a change in the geographic location of the communications device 30, 32, or based on the time of day (e.g. at 7 PM). Accordingly, if no communications event is received, the method 300 may return to block 310 to re-determine the usage adjustment factor and display the new usage adjustment factor at block 320.

At block 330, a communications event is received. For example, the user may initiate or accept a voice call.

At block 340, the communications device 30, 32 meters the communications event. For example, if the metric is time, the communications device 30, 32 may track a duration of the voice call. If the metric is data or bandwidth usage, the communications device 30, 32 may track the data or bandwidth required to support the voice call, send a message, or otherwise carry out the communications event.

At block 350, a determination is made as to whether the communications event is complete. If it is not completed, then the system returns to block 340 and continues to meter the communications event.

When the communications event is determined at block 350 to be complete, for example upon termination of the voice call, or upon successful sending of a message, the system proceeds to block 360. At block 360, the system, and in particular, the communications device 30, 32, determines the metered usage amount.

At block 370, an adjusted usage amount is determined based on the usage adjustment factor and the metered usage amount for the communications event. Specifically, the adjusted usage amount may be determined as the product of the usage adjustment factor and the metered usage amount for the communications event. In some embodiments, the adjusted usage amount may be determined upon completion of the communications event by the communications device 30, 32.

At block 380, the details of the communications event are recorded in the user data database 76. The details may include the parameters of the communications event, including, but not limited to, the time of the communications event, the geographic location of the communications device 30, 32 during the communications event, and other parameters used to determine the usage adjustment factor. The details may further include the metered usage amount, such as the duration of the communications event, or the bandwidth used to support the communications event. The details may further include the adjusted usage amount as determined by the communications device 30, 32 upon completion of the communications event. In other embodiments, the metered usage amount and the usage adjustment factor may be recorded in the user data database 76, and the communications routing system 42, and in particular, a pre-processing module of the communications routing system 42 may determine the adjusted usage amount based on the usage adjustment factor and the metered usage amount. The adjusted usage amount as determined by the communications routing system 42 may then be recorded in the user data database 76. In some embodiments, in addition to recording the adjusted usage amount in association with the particular communications event, a total or accumulated adjusted usage amount may be updated in association with the user account (e.g. as recorded in the account database 44) based on the adjusted usage amount. Specifically, the total or accumulated adjusted usage amount may represent the amount used during a billing period according to the adjusted usage amounts. In some examples, where the accumulated adjusted usage amount exceeds the allowed total usage amount of the user's carrier plan, the provision of communications services to the communications device 30, 32 may be restricted or terminated.

After recording the details of the communications event at block 380, the usage adjustment factor may again be determined at block 310.

Thus, during invoice generation, the billing system 43 may simply retrieve the predetermined bill rate and the accumulated adjusted usage amount from the accounts database 44 to generate the invoice amount. In other examples, the billing system 43 may retrieve the predetermined bill rate from the accounts database 44 and the individual adjusted usage amounts for each communications event from the user data databases 76 and apply the predetermined bill rate to the adjusted usage amounts to determine the invoice amount.

In other alternate embodiments, the usage adjustment factor and the metered usage amount may be recorded without determining and recording the adjusted usage amount. Thus, the billing system 43 may determine the adjusted usage amount for each communications event during determining the invoice amount. In particular, the billing system 43 may determine the adjusted usage amounts for each communications event based on the metered usage amount and the usage adjustment factor. Further, the billing system 43 may retrieve the predetermined bill rate and apply the predetermined bill rate to the adjusted usage amounts to determine the invoice amount.

Figure 4:
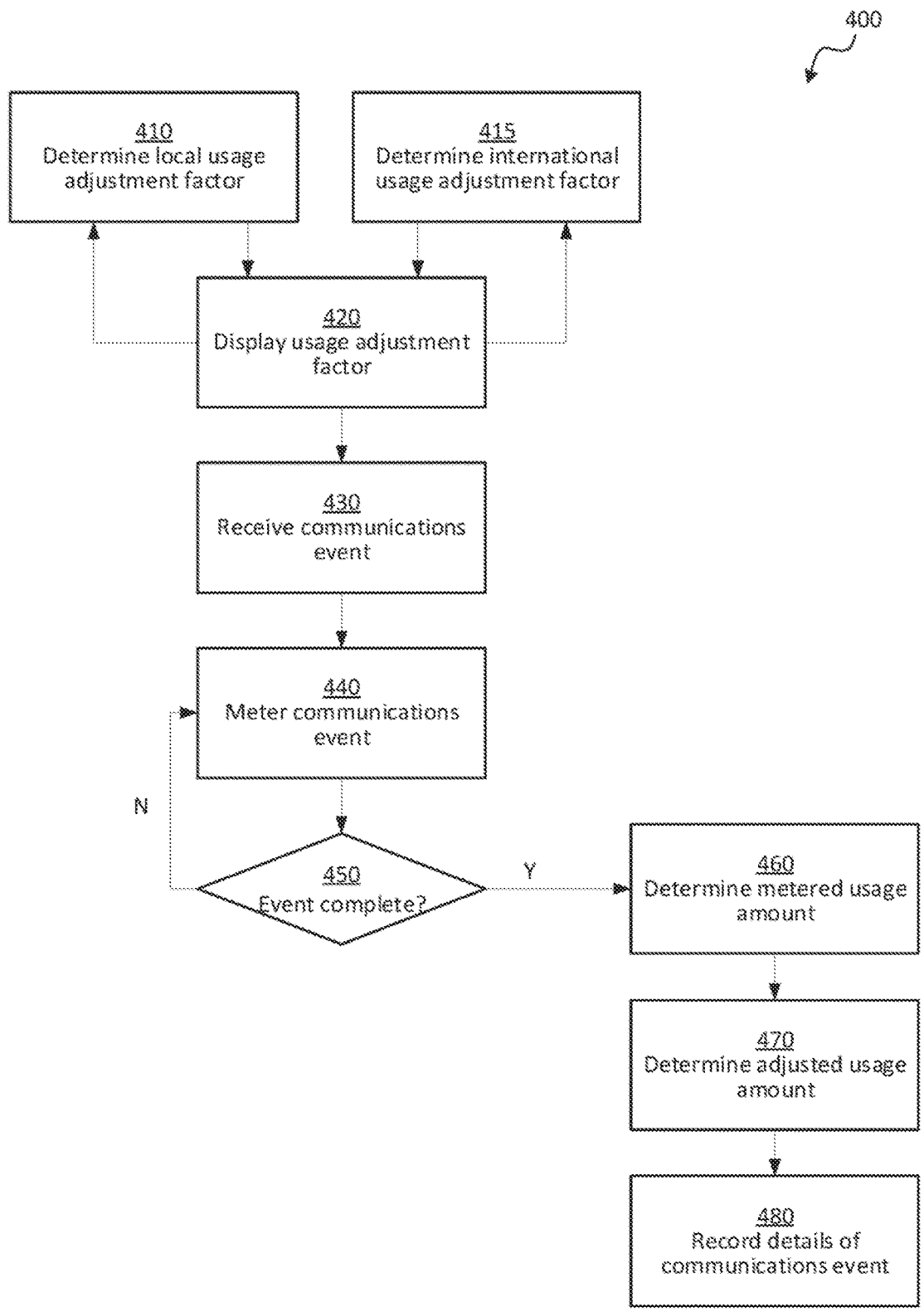
FIG. 4 is a flow diagram of a method of operating a communication device with multiple usage rates according to another embodiment

FIG. 4 shows a flow diagram of a method 400 of operating a communications device with multiple usage rates according to another embodiment. The method 400 is described with respect to the system of FIG. 1 and FIG. 2. The method 400 is performed by one of or both of the communications routing system 42 and the communications device 30, 32; and with the example of calculating the adjusted usage amount based on the usage adjustment factor and the metered usage amount before being stored in near real-time. In particular, the method 400 is for adjusting usage amounts to account for multiple usage rates in the communications system 100.

At block 410, a local usage adjustment factor is determined based on parameters determined by the communications device 30, 32. For example, the local usage adjustment factor may be determined based on the geographic location of the communications device 30, 32, as determined, for example, by a global positioning system (GPS) module of the communications device 30, 32, by an IP address, by the connected mobile network (carrier), and or by mobile country codes. The local usage adjustment factor may further be determined based on the time of day, the day of week, whether the communications device 30, 32 is connected with a Wi-Fi access point, and other parameters. For example, the usage adjustment factor may be lower when the communications device 30, 32 is connected to a Wi-Fi access point, or when it is an evening or weekend.

At block 415, an international usage adjustment factor is determined for communications events having a non-local (e.g. international, long-distance) destination. For example, the international usage adjustment factor may be determined form a table of adjustment factors to particular destinations. For example, the usage adjustment factor may be 2× for international voice calls. Optionally, the table of adjustment factors may include a number of countries or regions. Further, the table of adjustment factors by country may additionally include actual money rates (i.e. $1 per minute) where the actual money rates are determined based on the usage adjustment factor and the cost per unit of metered usage (e.g. cost per unit of time).

At block 420, the local usage adjustment factor and the international usage adjustment factor are displayed at the communications device 30, 32, as an indication of a multiplier of, for example, the home network cost. For example, the home network cost may have a day rate, a night rate, and a weekend rate. Alternatively, the usage adjustment factor may be a multiplier of a standard cost such as a fixed cost or a nominal network cost. In some examples, the usage adjustment factor may be displayed on the communications device 30, 32 with a roaming indicator. Thus, the user may see the different usage adjustment factors which may be applied based on the destination of the communications event.

In some embodiments, the usage adjustment factor may be recalculated after a predetermined period of time (e.g. every 30 minutes) or may be recalculated upon detection of a triggering event, such as a change in the geographic location of the communications device 30, 32, or based on the time of day (e.g. at 7 PM). Accordingly, if no communications event is received, the system may return to block 410 and/or 415 to re-determine the usage adjustment factor and display the new usage adjustment factor at block 420.

At block 430, a communications event is received. For example, the user may initiate or accept a voice call.

At block 440, the communications device 30, 32 meters the communications event. For example, if the metric is time, the communications device 30, 32 may track a duration of the voice call. If the metric is data or bandwidth usage, the communications device 30, 32 may track the data or bandwidth required to support the voice call, send a message, or otherwise carry out the communications event.

At block 450, a determination is made as to whether the communications event is complete. If it is not completed, then the system returns to block 440 and continues to meter the communications event.

When the communications event is determined at block 450 to be complete, for example upon termination of the voice call, or upon successful sending of a message, the system proceeds to block 460. At block 460, the system, and in particular, the communications device 30, 32, determines the metered usage amount.

At block 470, an adjusted usage amount is determined based on the usage adjustment factor and the metered usage amount for the communications event. Specifically, the communications device 30, 32 may first determine the applicable local or international usage adjustment factor, and the adjusted usage amount may be determined as the product of the applicable usage adjustment factor and the metered usage amount for the communications event. In some embodiments, the adjusted usage amount may be determined upon completion of the communications event by the communications device 30, 32.

At block 480, the details of the communications event are recorded in the user data database 76. The details may include the parameters of the communications event, including, but not limited to, the time of the communications event, the geographic location of the communications device 30, 32 during the communications event, and other parameters used to determine the usage adjustment factor. The details may further include the metered usage amount, such as the duration of the communications event, or the bandwidth used to support the communications event. The details may further include the adjusted usage amount as determined by the communications device 30, 32 upon completion of the communications event. In other embodiments, the metered usage amount and the usage adjustment factor may be recorded in the user data database 76, and the communications routing system 42, and in particular, a pre-processing module of the communications routing system 42 may determine the adjusted usage amount based on the usage adjustment factor and the metered usage amount. The adjusted usage amount as determined by the communications routing system 42 may then be recorded in the user data database 76. In some embodiments, in addition to recording the adjusted usage amount in association with the particular communications event, a total or accumulated adjusted usage amount may be updated in association with the user account (e.g. as recorded in the account database 44) based on the adjusted usage amount. Specifically, the total or accumulated adjusted usage amount may represent the amount used during a billing period according to the adjusted usage amounts. In some examples, where the accumulated adjusted usage amount exceeds the allowed total usage amount of the user's carrier plan, the provision of communications services to the communications device 30, 32 may be restricted or terminated.

After recording the details of the communications event at block 480, the local and international usage adjustment factors may again be determined at blocks 410 and 415.

Thus, during invoice generation, the billing system 43 may simply retrieve the predetermined bill rate and the accumulated adjusted usage amount from the accounts database 44 to generate the invoice amount. In other examples, the billing system 43 may retrieve the predetermined bill rate from the accounts database 44 and the individual adjusted usage amounts for each communications event from the user data databases 76 and apply the predetermined bill rate to the adjusted usage amounts to determine the invoice amount.

In other alternate embodiments, the usage adjustment factor and the metered usage amount may be recorded without determining and recording the adjusted usage amount. Thus, the billing system 43 may determine the adjusted usage amount for each communications event during determining the invoice amount. In particular, the billing system 43 may determine the adjusted usage amounts for each communications event based on the metered usage amount and the usage adjustment factor. Further, the billing system 43 may retrieve the predetermined bill rate and apply the predetermined bill rate to the adjusted usage amounts to determine the invoice amount.

Figure 5:
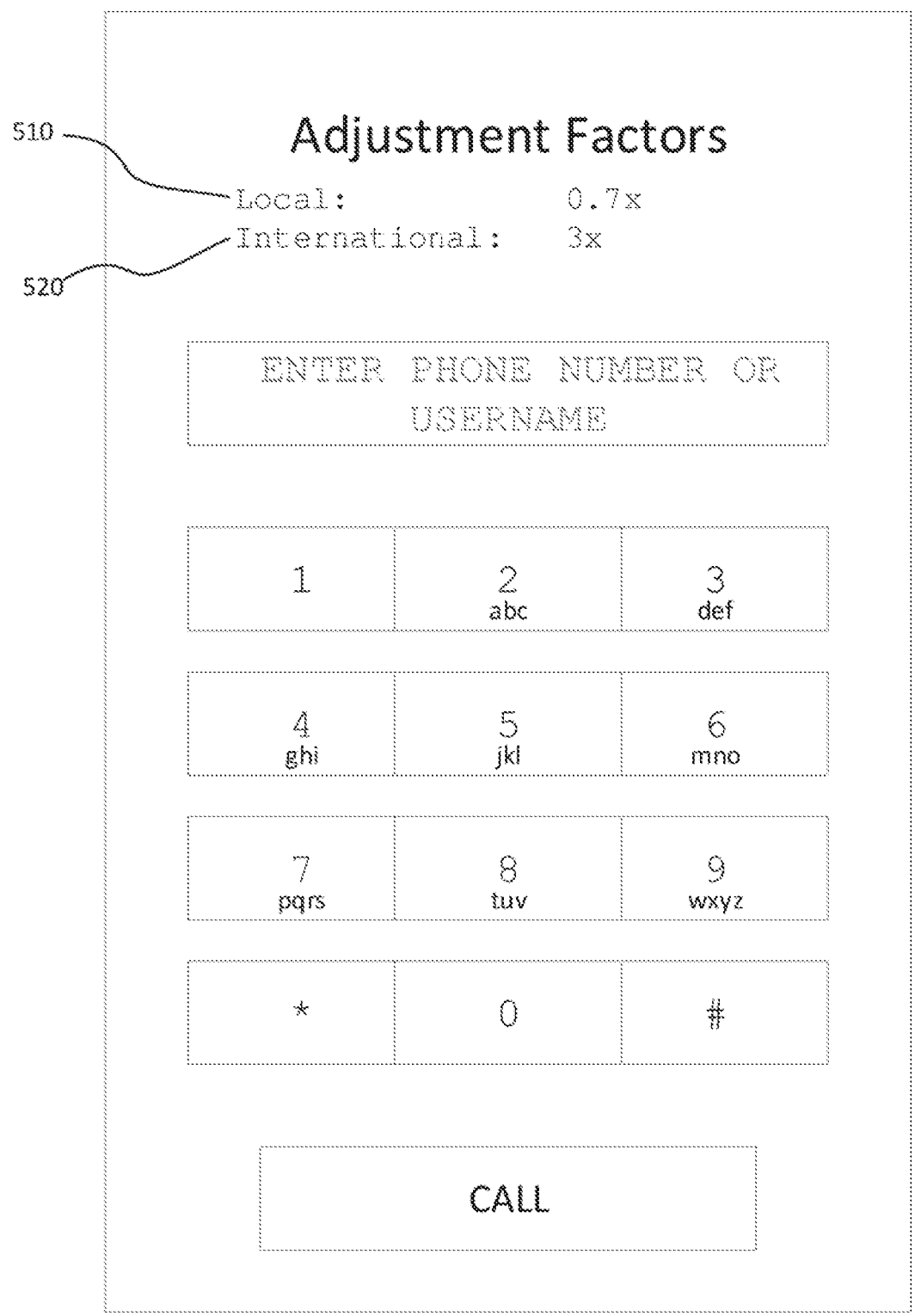
FIG. 5 is a diagram of a display of a communications device displaying usage rates in a screen for initiating a voice call accordingly to FIG. 4.

FIG. 5 shows a diagram of a display of a communications device 30, 32 displaying usage adjustment factors for initiating a voice call according to the method of FIG. 4. The communications device 30, 32 displays local usage adjustment factor 510 being a multiple of 0.7 (i.e. resulting in an adjusted usage amount of 70 MB when 100 MB of metered usage amount was recorded) and an international usage adjustment factor 520 being a multiple of 3 (i.e. resulting in an adjusted usage amount of 300 MB when 100 MB of metered usage amount was recorded).

Communications systems may employ multiple rates based on different parameters of usage for metered communications services. For example, the rates may differ based on time of day, day of week, geographic location, roaming networks, and the like. Communications system may therefore determine a usage adjustment factor to apply to a metered usage amount to obtain an adjusted usage amount. In particular, the usage adjustment factor may be determined in near real-time, for example, by the communications device prior to or immediately following the communications event, or by a pre-processing module of a communications routing system. Thus, a user may view the usage adjustment factor at the time of the communications event. Further, the communications routing system may store the usage adjustment factor, the metered usage amount, or simply the adjusted usage amount, rather than all the parameters of the communications event. Thus, the present system reduces the amount and complexity of database storage and retrieval for the details of each communications event.

Further, the adjusted usage amount may be stored in association with a user account to obtain an accumulated adjusted usage amount. In this manner, users may view the accumulated adjusted usage amount during a billing period, which accounts for different communications events occurring under different parameters and having different usage rates. This allows a single, pre-determined bill rate to be applied to the accumulated adjusted usage amount by a billing system, thus reducing the operational and computational burden in billing systems. Specifically, the present system reduces the amount and complexity of database retrievals by the billing system, by providing a single accumulated adjusted usage amount. The number of computations to determine an invoice total is reduced, as the billing system need not assess parameters of each communications event and retrieve a separate bill rate for each communications event.

While the foregoing provides certain non-limiting example implementations, it should be understood that combinations, subsets, and variations of the foregoing are contemplated. The monopoly sought is defined by the claims.

What is claimed is:

1. A method in a communications system, the method comprising:
    determining a usage adjustment factor for a communications event occurring at a communications device, the usage adjustment factor based on parameters of the communications event;
    determining a metered usage amount for the communications event; and
    applying the usage adjustment factor to the metered usage amount to obtain an adjusted usage amount corresponding to the parameters of the communications event; and
    determining an invoice amount based on the adjusted usage amount and a predeteremined bill rate.

2. The method of claim 1, wherein the adjusted usage amount is determined by a communications routing system prior to determining the invoice amount by a billing system.

3. The method of claim 1, wherein the adjusted usage amount is determined by a billing system during the determination of the invoice amount.

4. The method of claim 1, wherein the usage adjustment factor is determined based on one or more of: a geographic location, a day of week, a time of day, a promotional event, a special sales rate, terms of a carrier plan, and a network rate.

5. The method of claim 1, further comprising displaying the usage adjustment factor on a communications device.

6. The method of claim 5, wherein the usage adjustment factor is displayed on the communications device with a roaming indicator.

7. The method of claim 1, wherein the metered usage amount is based on one or more of: bandwidth used for the communications event, a duration of the communications event, and cost per unit of time for the communications event.

8. The method of claim 1, wherein the usage adjustment factor is a multiple of a fixed cost.

9. The method of claim 1, wherein the usage adjustment factor is a multiple of a home network cost.

10. A non-transitory computer-readable medium storing computer-readable instructions which, when executed, cause a processor to:
    determine a usage adjustment factor for a communications event occurring at a communications device;
    determine a metered usage amount for the communications event;
    apply the usage adjustment factor to the metered usage amount to obtain an adjusted usage amount corresponding to the parameters of the communications event; and
    determine an invoice amount based on the adjusted usage amount and a predetermined bill rate.

11. The computer-readable medium of claim 10, wherein the adjusted usage amount is determined prior to determining the invoice amount.

12. The computer-readable medium of claim 10, wherein the adjusted usage amount is determined during the determination of the invoice amount.

13. The computer-readable medium of claim 10, wherein the usage adjustment factor is determined based on one or more of: a geographic location, a day of week, a time of day, a promotional event, a special sales rate, terms of a carrier plan, and a network rate.

14. The computer-readable medium of claim 10, wherein the metered usage amount is based on one or more of: bandwidth used for the communications event, a duration of the communications event, and cost per unit of time for the communications event.

15. The computer-readable medium of claim 10, wherein the usage adjustment factor is a multiple of a fixed cost.

16. The computer-readable medium of claim 10, wherein the usage adjustment factor is a multiple of a home network cost.

* * * * *

UNITED STATES PATENT AND TRADEMARK OFFICE
CERTIFICATE OF CORRECTION

PATENT NO.         : 11,006,252 B2
APPLICATION NO.    : 16/861852
DATED              : May 11, 2021
INVENTOR(S)        : Derek Ting It is certified that error appears in the above-identified patent and that said Letters Patent is hereby corrected as shown below:

In the Specification

1. Column 3, Line 61 in Detailed Description:
"… an may be …" should read - … and may be … -

2. Column 3, Line 66 in Detailed Description:
"… number of reasons such time of day, …" should read - … number of reasons such as time of day, … -

3. Column 4, Line 5 in Detailed Description:
"… prepare…" should read - preparing -

4. Column 5, Line 34 in Detailed Description:
"… place …" should read - placed -

5. Column 6, Line 40 in Detailed Description:
"… district …" should read - distinct -

6. Column 12, Line 16 in Detailed Description:
"… the invoice amount is …" should read - … the invoice amount … -

7. Column 14, Line 20 in Detailed Description:
"… programs on the of the …" should read - …. programs on the …. -

8. Column 14, Line 24 in Detailed Description:
"… communications devices 30, 32 of …" should read - … communications devices 30, 32 … -

9. Column 14, Line 29 in Detailed Description:
"… device 30, 32 is in the another …" should read - … device 30, 32 is in another … -

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,006,252 B2

10. Column 17, Line 13 in Detailed Description:
"... form ..." should read - form -